United States Patent Office 2,804,576
Patented Aug. 27, 1957

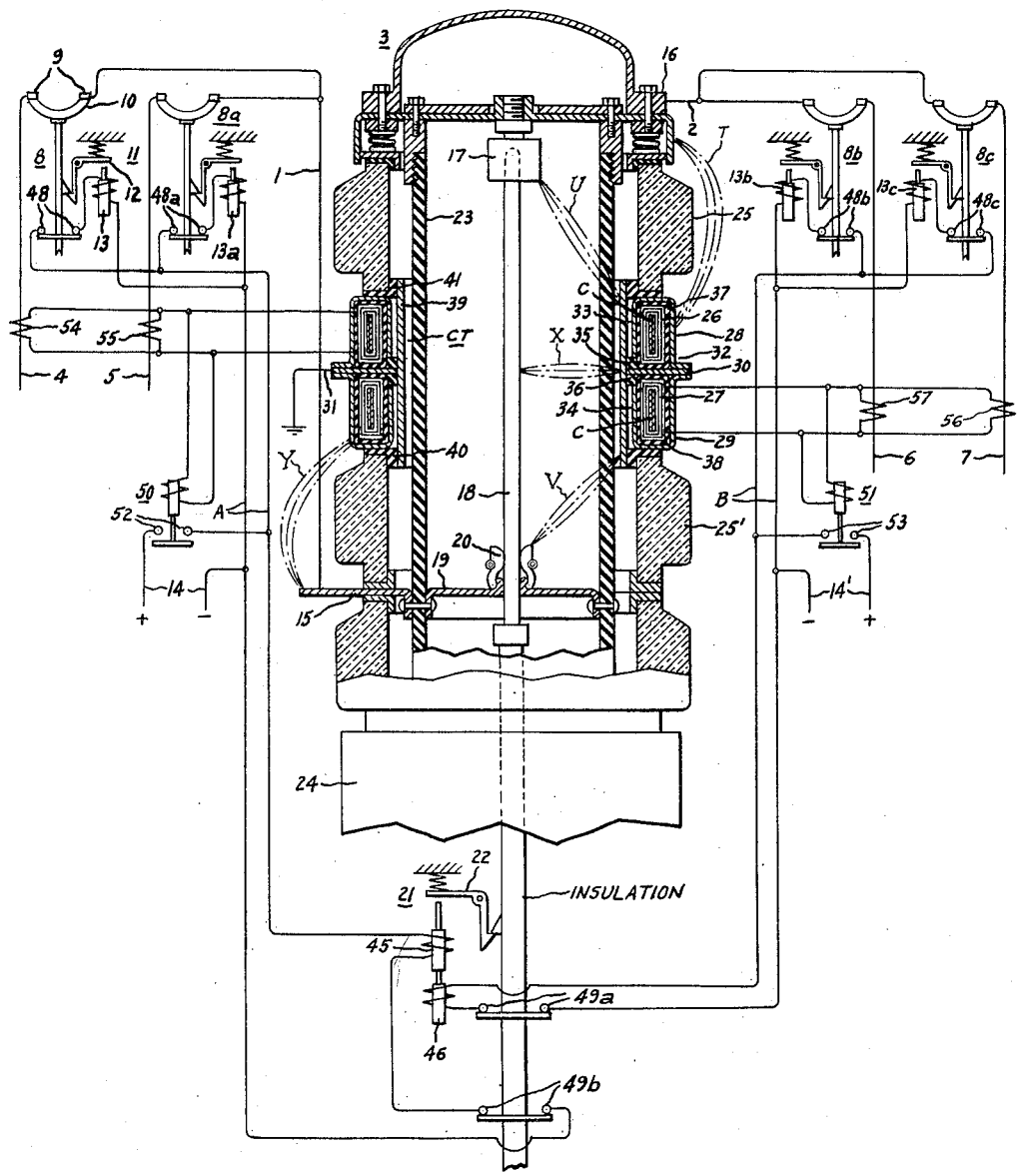

2,804,576

ELECTRICAL PROTECTIVE EQUIPMENT

Thellwell R. Coggeshall, Bala-Cynwyd, and Herman Bany, Lansdowne, Pa., assignors to General Electric Company, a corporation of New York Application May 6, 1953, Serial No. 353,358

25 Claims. (Cl. 317—9)

This invention relates to electrical systems having protective equipment associated therewith and, more particularly, to a new and improved current transformer mounting and construction which will provide correct operation of said protective equipment under all conditions.

In certain electrical systems, for example, those in which a plurality of electrical circuits are connected to bus sections through circuit breakers, and the bus sections are electrically interconnected through a bus-tie circuit breaker, it is most important that the bus-tie circuit breaker be provided with means for distinguishing between those faults occurring within the bus-tie circuit breaker itself and those faults occurring external to said bus-tie breaker, which the bus-tie breaker in opening will clear. This selectivity is important because when a fault occurs within the bus-tie circuit breaker, this internal fault is likely to be one which the bus-tie breaker itself cannot clear and, therefore, all other breakers connected to the two bus sections must be relied upon to clear the fault so as to prevent current from being fed from the bus sections into the fault. Hence, it is necessary that both the bus-tie breaker and all the other breakers connected to the bus sections be opened in the case of such an internal fault within the bus-tie breaker. In contrast to the requirements of this internal fault condition, in the event of a fault external to the bus-tie breaker, such as an insulation flashover to ground outside of the breaker housing, in order to clear the fault the bus-tie breaker and only those breakers connected to that bus section on the fault side of the bus-tie breaker need be opened—the electric circuits on the unfaulted side of the breaker should desirably remain operatively connected to their bus section.

In protective systems designed to carry out these desired functions, e. g. differential protective systems, it is customary to utilize, for sensing the fault and the nature of the fault, a pair of current transformers mounted in "overlapping" relationship. That is, the current transformer means protecting one portion of the electrical system extends into, or overlaps into, a portion of the electrical system protected by a second current transformer means.

An important feature of the conventional overlapping differential protective system is the location of the overlapping current transformers on opposite sides of the contacts of an associated circuit breaker and at opposite ends of the internal circuit through this breaker. To explain further, with overlapping protective equipment, it is possible to distinguish between faults occurring in the zone of the electric circuit between the overlapping current transformers and those faults occurring outside of this zone. Where it is desired to distinguish between faults at any point in the internal circuit of the breaker and those external thereto, the effectiveness of this prior art arrangement depends upon whether the zone of the electric circuit between the overlapping current transformers can be made coextensive with the internal circuit of the breaker. Where the transformers are mounted on bushing structures at the terminals of the breaker, as is the case in the conventional tank-type breaker, it is obvious that the desired coextensiveness is obtained.

In some types of circuit breakers, in contrast to the tank-type breaker, it is not practical because of space and cost considerations to position the overlapping current transformers at the breaker terminals, and under such circumstances, the zone of the electrical circuit extending between the current transformers will not be coextensive with the internal circuit of the breaker. In such a case, if the current transformers are supported on the breaker with their usual metallic supporting parts grounded in the conventional manner, the current transformers are incapable of distinguishing between faults external to the breaker and those faults internal to the breaker which occur outside the zone between the current transformers. It is primarily this problem with which this invention is concerned.

It, therefore, is an object of this invention to provide an electrical system with new and improved protective equipment.

It is a further object of this invention to provide a construction which makes it possible to mount the current transformers of an overlapping differential protective system at points remote from the terminals of a circuit breaker without affecting the ability of the transformers to distinguish between faults in the internal circuit of the circuit breaker and those faults external to said internal circuit.

It is a further object of this invention to shield the current transformers in such a manner that they may be mounted in juxtaposed relationship on a circuit breaker housing by a sturdy and inexpensive mounting and yet are adapted in this relationship to accurately distinguish between faults occurring within said housing and those external thereto.

It is still another object of this invention to construct and shield the current transformers in such a manner that alternate breakdown paths to ground with respect to the transformers are provided, one path favoring internal fault currents and the other path favoring external fault currents in such a manner that the current transformers may accurately distinguish between internal and external faults. The term "fault current," as used in this application, denotes that current which flows to ground from a breakdown point in the power circuit.

The objects of my invention may be realized through the provision of a pair of juxtaposed current transformer windings shielded and mounted on a circuit breaker housing in such a manner that fault currents external to the housing will take one breakdown path to ground with respect to the windings and fault currents internal to the housing will take a different breakdown path to ground with respect to the windings. The latter path to ground is inductively linked with one of the windings and extends between the two windings, whereas the former path to ground is external to the windings and is essentially independent of inductive linkage with said windings, whereby to cause said current transformers to accurately distinguish between internal and external fault currents so as to cause proper relaying of an associated differential protective system.

The invention will be better understood by considering the following description taken in connection with the accompanying drawing, and its scope will be pointed out in the appended claims.

The single figure of the drawing is a view, partly in schematic form and partly in section, showing an electrical system embodying the invention.

The electrical system shown in the drawing may be designed for either single phase or polyphase operation, but for the purposes of simplicity, portions of the system are illustrated by means of a conventional one line diagram.

A pair of electrical conductors which, for illustrative purposes, may be designated bus sections 1 and 2 are electrically interconnected through a circuit breaker 3 which may be termed the bus-tie circuit breaker. Connected to bus section 1 are electrical circuits 4 and 5, and connected to bus section 2 are electrical circuits 6 and 7. These electrical circuits may be feeder circuits for supplying electrical energy to a bus section, or may be distribution circuits for supplying electrical energy from a bus section to a load. The circuits 4, 5, 6 and 7 are respectively connected to associated bus sections 1 or 2 through circuit breakers 8, 8a, 8b and 8c. These circuit breakers are shown only schematically in the drawing since they may be of any conventional type. Since all of these circuit breakers may be substantially identical, it is considered necessary to describe only a single one. More particularly, circuit breaker 8, located at one side of the bus-tie breaker 3, includes a pair of fixed contacts 9 adapted to be bridged by a movable bridging contact 10 which is biased toward open position and is latched in the closed position shown by a latching mechanism 11. Latch 12 of the latching mechanism is biased toward latching position and is motivated to the tripped position by means of an electromagnetic device or solenoid 13 which may derive energy from a tripping source which preferably is a direct current source indicated at 14. For simplicity, the breakers 8b and 8c on the opposite side of the bus-tie breaker 3 are shown as having their trip mechanism operable from a separate tripping source 14', but it is obvious that all of the breaker trip mechanisms could be operated from a single source.

The bus-tie breaker 3 is a high voltage impulse type of breaker having terminal portions 15 and 16 respectively connected to bus sections 1 and 2. Terminal portion 16 has a relatively fixed contact 17 connected thereto. A movable contact 18 is electrically connected to opposite terminal portion 15 by means of a conductor 19 and the usual current transfer fingers 20. The separable contacts 17 and 18, which are shown latched in closed position by latching mechanism 21, are suitably biased toward open position and are adapted to separate in response to tripping of the latch 22, which is biased toward latching position. An interrupting chamber about the contacts 17 and 18 is defined by a cylindrical member 23 formed of insulating material and suitably supported from a base 24. Circuit breakers of this general type are well known in the art.

The interrupting chamber is mounted within a weatherproof insulating column or housing supported from the base 24 and comprising generally cylindrical porcelain shells, or housing portions, 25, 25'. Interposed between these porcelain shells is a bushing current transformer assembly CT comprising a pair of current transformers having windings 26 and 27, each of which is wound about a conventional annular, or tubular, core C surrounding the cylindrical member 23. These windings are generally toroidal in form and also surround the cylindrical member 23. Winding 26 is partially enclosed by a metallic shielding casing 28 and winding 27 by a similar metallic shielding casing 29. These casings 28 and 29 are interconnected through the outer peripheral portion of a metallic plate 30 which constitutes conducting structure extending radially between the two current transformers and connected between opposed flanges formed at the outer periphery 32 of casings 28 and 29, the metallic plate and casing means being grounded at the outer peripheral portion of the assembly, as indicated at 31. For reasons which will become apparent as the description proceeds, the inner peripheral portions 33 and 34 of the respective casings 28 and 29 are insulated at 35, 36 from the inner peripheral portion of the ground connected plate 30, and the only electrical connection between the casings and the plate is adjacent the outer peripheries 32 thereof. Suitable insulation 37, 38 of a well-known character insulates the windings 26 and 27 from the casings 28, 29 and from the ground connected plate 30. Mounted radially inwardly of the current transformer windings 26 and 27 and of casings 28 and 29 is a generally cylindrical conductive sleeve 39 which constitutes conductive shielding structure and extends axially along the current transformer assembly on opposite sides of the plate 30 and for a major portion of the axial length of said assembly. This conductive shielding sleeve is connected to the inner periphery of grounded plate 30, is insulated from the casing means 28, 29 at all points except for the connection through plate 30 and cooperates with the other structure of the current transformer assembly to produce the novel results hereinafter described. Suitable gaskets 40 and 41 at opposite ends of the assembly assure a weatherproof bushing structure.

Inspection of this current transformer assembly CT, as shown in the drawing, makes it apparent that the primary circuit of the current transformer secondary windings 26 and 27 normally comprises conductor 18 and accordingly, current flow through conductor 18 normally induces a current flow in both secondary windings 26 and 27. Effective current flow through conducting sleeve 39, since this sleeve 39 is encompassed by the cores C of the current transformer assembly, would similarly induce a current flow in a secondary winding 26 or 27. Current flows through this sleeve 39 only under internal fault conditions, such as indicated, for example, at U or V, but under such conditions the sleeve 39 would, in effect, constitute a portion of the primary circuit for the current transformer assembly. To explain further, if effective current flows through fault V to ground, a current would be induced in secondary winding 27, or alternatively, if effective current flows through fault U to ground, current would be induced in winding 26. Thus, it may be stated that the paths formed by elements 18 or 39 through the current transformer assembly CT are inductively linked with the secondary winding structure. As for fault currents flowing to ground in the casing means 28, 29, as would take place under external fault conditions such as illustrated at T or Y, these fault currents would have substantially no magnetic effect on the secondary windings and, hence, such fault currents are considered to flow to ground through a breakdown path which is essentially independent of inductive linkage with the secondary windings. The insulation provided at the inner peripheral portions 33 and 34 of casings 28 and 29 prevents such external fault currents from flowing to ground through a path encompassed by the secondary windings. The significance of these features of the current transformer assembly CT will appear more clearly as the description proceeds.

In order to protect the electrical system shown in the drawing, normally-open differential relays 50 and 51 are provided for selectively or collectively controlling the tripping of the circuit breakers included within the system. For this purpose, differential relay 50 includes contacts 52 which when closed, establish a tripping circuit, generally indicated at A, for the tripping means associated with circuit breakers 8, 8a and 3. For example, closure of contacts 52 connects the tripping means 13 and 13a of circuit breakers 8 and 8a, respectively, across the source 14 and, similarly, connects a tripping means 45 of circuit breaker 3 across source 14. In a corresponding manner, differential relay 51 includes contacts 53 which upon closure are adapted by means of a tripping circuit, generally shown at B, to connect the tripping means 13b, 13c, and 46 across source 14', in response to which breakers 8b, 8c, and 3 will be tripped open.

Energization of differential relay 50 is effected from a differential circuit including current transformer secondary windings 26, 54 and 55, which are energized in accordance with the current flowing in their respective primaries which, under normal conditions, are conductors 18, 4 and 5. The circuit including the transformer windings 26, 54, 55 is constructed in a well-known manner so that under normal conditions, that is, when there is no fault in the power circuit disposed between the transformer secondaries, no effective current will flow in the winding of differential relay 50. The relay 50 is energized in accordance with the difference between effective current flowing in the primary conductors 18, 39 of winding 26 and the sum of the currents flowing in the primaries 4 and 5 of windings 54 and 55, respectively. The operation of differential relay arrangements of this general type is well-understood in the art, and it is apparent that other well-known differential relay arrangements could equally well be used.

Energization of differential relay 51 is effected from a circuit including current transformer secondary windings 27, 56 and 57. The winding of relay 51 is connected in this circuit in the same manner as described with respect to relay 50. Similarly, it will be understood that relay 51 will be energized in accordance with the difference between the effective current flowing in the primary conductors 18, 39 of winding 27 and the sum of the currents flowing in the primaries 6 and 7 of windings 57 and 56, respectively.

It is apparent from the drawing that the current transformers of the assembly CT are mounted in overlapping relationship. That is, current transformer winding 26, which forms a part of the current transformer means 26, 54, 55 protecting one portion of the system, extends into, or overlaps into, the portion of the system protected by the second transformer means 27, 56, 57. This may be illustrated by the location of current transformer winding 26 in that portion of the primary power circuit which includes the terminal 16 and which extends between the current transformer windings 56, 57 and the current transformer winding 27. More particularly, current transformer winding 26 is located between terminal 16 and current transformer winding 27. Similarly, the winding 27 is located in that portion of the primary power circuit including terminal 15 and extending between windings 54, 55 and winding 26. More particularly, winding 27 is located between terminal 15 and winding 26.

The tripping circuits A and B should desirably contain means for deenergizing the tripping solenoids after said solenoids have effected opening of their associated circuit breakers. To this end, contacts 48, 48a, 48b and 48c are provided in the tripping circuits of the breakers 8, 8a, 8b and 8c, respectively. From the drawing, it will be obvious that these contacts will be opened in response to opening of an associated breaker thereby deenergizing the associated trip means. In a like manner, contacts 49a and 49b are provided in the tripping circuits for the breaker 3 and are adapted to be opened in response to tripping of breaker 3, thereby deenergizing trip means 45 or 46.

The operation of the above-described protective equipment will now be described. As has been previously stated, faults in the internal circuit of the circuit breaker are likely to be faults which the breaker itself cannot clear, therefore, all of the associated breakers must be relied upon to clear the fault so as to prevent current from being fed from either of the bus sections into the fault. Under such conditions, it is, therefore, necessary to open, in addition to the bus-tie breaker, the breakers in the bus sections on both sides of the bus-tie breaker. In contrast to the requirements of this internal fault condition, in the event of a fault external to the bus-tie breaker, such as an insulation flashover to ground outside of the breaker housing, in order to clear the fault the bus-tie breaker and only those breakers on the fault side of the bus-tie breaker need be opened—the electric circuits on the unfaulted side of the breaker should desirably remain operatively connected to their bus sections.

The above requirements for collectively operating all breakers in the case of an internal fault and for selectively operating certain of said breakers in the case of an external fault necessitate that the current transformers associated with the circuit breaker be capable of distinguishing between internal and external faults. The novel construction of the current transformers of this invention effectively fulfills these requirements, as is demonstrated hereinafter.

Assume that a fault should occur at Y, i. e., an external fault or insulation flashover on the bus-section 1 side of the bus-tie breaker. Under such conditions, it would be necessary to open only the bus-tie breaker 3 and breakers 8 and 8a on the fault side of breaker 3, while leaving the breakers 8b and 8c closed. If current be assumed to be flowing into the bus-tie breaker 3 from terminal 16 to terminal 15 at the instant the fault Y begins, it is apparent that there will be a difference in the current flowing through conductor 18 and the sum of the currents in conductors 4 and 5 since at least a portion of the current flowing through conductor 18 is fed into the fault. This difference in currents will be detected by the current transformer windings 26, 54 and 55, which will effect operation of differential relay 50, which in turn effects energization of trip means 13, 13a and 45. Thus, it will be seen that the breakers 8 and 8a and the bus-tie breaker 3 will be opened, as required. It will also be apparent that relay 51 will not be effected by the fault Y, and hence, breakers 8b and 8c will remain closed as desired. This is the case because, since the fault is at Y, the current flowing through the conductor 18 will equal the sum of the currents flowing through conducting units 6 and 7. The fault current at Y flows to ground at 31 through the outer casing 29 of the current transformer assembly, and since the breakdown path through casing 29 is substantially independent of inductive linkage with the secondary winding 27, this fault current at Y has no effect on the energization of secondary winding 27.

If the fault be assumed to be located at the opposite external side of the bus-tie breaker, that is at T instead of Y, operation of relay 51 will be effected, but relay 50 will remain deenergized, and as a result only circuit breakers 8b and 8c on the fault side of the bus-tie breaker and the bus-tie breaker 3 will be tripped open. The reason that relay 51 will operate is, of course because the primary current through conductor 18 no longer equals the sum of currents in conductors 6 and 7, and so the sum of the secondary currents through windings 27, 56 and 57 is no longer equal to zero. The reason that relay 50 remains inactive is because the fault current at T flows through the outer casing 28 of the current transformer assembly, and so there is no effect on the secondary winding 26 from this fault current at T. Thus, it is apparent that for external faults the protective equipment of this invention will selectively isolate the faulted portion of the electrical system.

With respect to internal faults, an essential characteristic of prior art differential protective arrangements is that the zone of the electrical circuit between the secondary windings of the current transformers is coextensive with the internal circuit of the breakers. So long as it is practical to make this zone coextensive with the internal circuit of the circuit breaker, the prior art arrangement could distinguish between external and internal faults. However, in certain types of circuit breakers, it is not practical because of cost or space requirements to mount the current transformer windings in locations which would produce the desired coextensiveness. In such cases, if the current transformers have metallic supporting parts grounded in the manner of the conventional current transformers, the current transformers could not distinguish between faults extenal to the breaker and those in the internal circuit of the breaker but outside of the zone between the two current transformer windings.

This invention makes it possible to disregard the coextensive relationship previously required, and hence to mount the overlapping current transformers in a simple and inexpensive manner. By constructing the current transformers in accordance with this invention, this simple mounting may be attained without affecting the ability of the overlapping current transformers to distinguish between external and internal faults. To this end, we have provided the current transformer assembly shown generally at CT, the structural details of which have already been described. Because of the particular structure of the breaker with which this current transformer assembly CT is associated, it is desirable to mount the assembly at one side of the fixed contact 17 and approximately midway between terminals 15 and 16. When so mounted, the porcelain shells 25 and 25' encompass that portion of the internal circuit which is outside of the zone extending between the two windings of current transformer assembly. In certain cases it is desirable or necessary to mount the assembly nearer one or the other of the terminals. Additionally, in certain other cases, it is desirable to mount the individual current transformer secondaries in axially-spaced relationship. The general design of current transformers constructed in accordance with this invention will operate equally well for each of these alternative mounting arrangements.

The characteristics of the current transformer assembly CT with respect to the detection of internal faults will now be described. As has been pointed out, the primary circuit of the current transformer secondary windings 26 and 27 may comprise either the conductor 18 or the conducting shielding sleeve 39, and any effective current flow in either of these conductors 18 or 39 will induce a current flow in the secondary winding through which said effective current flows. Assume now, for example, that a fault occurs at V, i. e., at a location in the internal circuit of the bus-tie breaker but outside of the zone of the circuit extending between the current transformer windings 26 and 27. Any fault to ground occurring within the circuit breaker housing will be directed to ground through conductive shielding members 39 and 30 since this is the path of least breakdown strength for such faults. This general concept may be alternatively expressed by pointing out that for substantially all possible breakdown paths from said internal circuit to ground, the grounded structure 39, which is encompassed by the windings, is interposed in the breakdown path between said internal circuit and any other adjacent grounded structure. Thus fault current V would be forced to follow a path to ground along said conductive member 39 and between the current transformer windings 26 and 27. If it be assumed that current is flowing from terminal 15 to terminal 16 of the circuit breaker at the instant fault V occurs, it will be apparent that the current flowing in the primary conductor of the current transformer winding 27 will not be equal to the sum of the currents in the primary conductor of current transformer windings 56 and 57, since at least a portion of the current in the primary of winding 27 is diverted to ground before reaching the transformer windings 56 and 57. Accordingly, relay 51 will be energized and the bus-tie breaker 3 together with breakers 8b and 8c on one side of said bus-tie breaker will be tripped. It will also be apparent that when the fault occurs at V, the current flowing in the primary of the current transformer winding 26 will be unequal to the sum of the currents flowing in the primaries of current transformers 54 and 55, since at least a portion of the current flowing from circuits 4 and 5 is diverted to ground through member 30 before reaching the current transformer 26. Accordingly, relay 50 will be energized to effect tripping of the breakers 8 and 8a on the opposite side of the bus-tie breaker 3. Thus, it will be seen that for an internal fault V, the circuit breakers on both sides of the bus-tie breaker will be opened as desired. Although, in the illustrative example, the current was assumed to be flowing from terminal 15 to terminal 16, the desired operation of the differential protective system will be obtained irrespective of the direction of current flow.

It will also be apparent that internal faults such as those located at U or X, as shown in the drawing, will effect the operation of the differential protective system in substantially the same manner as described with respect to the fault occurring at V, that is, the breakers on both sides of the bus-tie breaker 3 will be tripped upon the occurrence of such internal faults. For example, assume current flow from terminal 15 to 16 at the instant a fault occurs at U. Relay 51 will operate due to the difference of full fault produced current from winding 27 and zero fault produced current from windings 56 and 57. Accordingly, breakers 3, 8b, and 8c will be tripped open. Assuming still a fault at U and current flow from 15 to 16, relay 50 will operate due to the difference of full fault produced current from windings 54 and 55 and zero fault produced current from winding 26. The reason that no current is induced in winding 26 under such conditions is that the primary current for winding 26 flows from terminal 15 to U and then doubles back through the shielding path 39, 30 to ground, thus, in substance cancelling out the effect of the primary current flow from terminal 15 to fault U. Thus, since relay 50, under the assumed conditions, operates in response to this zero current flow in winding 26, the breakers 8 and 8a are tripped open. So, in summary, it may be seen that in response to a fault at U the breakers 8, 8a, 8b, and 8c at both sides of the bus-tie breaker will be opened as desired. Similarly, for a fault at X instead of U these breakers 8, 8a, 8b and 8c at both sides of the bus-tie breaker will be opened. For example, for a fault at X if current be assumed as flowing from terminal 15 to 16, winding 26 will receive zero fault produced current and windings 54, 55 will receive full fault produced current, thus causing operation of relay 50. Assuming still current flow from terminal 15 to 16, relay 51 will also be operated because winding 27 receives full fault produced current since the fault produced current flows through the primary 18 of winding 27, however windings 56 and 57 receive zero fault produced current since the fault current is diverted to ground at X before reaching the magnetic circuits of windings 56 and 57. Thus, the sum of the currents through windings 27, 56 and 57 is no longer equal to zero and, accordingly, operation of relay 51 is effected. Thus, both relays 50 and 51 are operated when an internal fault occurs at X, thereby opening the breakers at both sides of the bus-tie breaker, as desired.

The above-described mode of operation illustrates that the current transformers of this invention are capable of accurately distinguishing between faults in any part of the internal circuit of the circuit breaker and those faults external to said internal circuit, whereby to selectively or collectively control the associated protective equipment depending upon the location of the fault, as is desired.

While we have shown our invention as applied to a pair of current transformers, in some installations it is necessary to use differential protection on only one of the bus sections. In such installations, a single current transformer located in the circuit of the bus-tie breaker and constructed in accordance with our invention would provide the desired protection.

While there has been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

What we claim as new and desire to secure by Letters Patent of the United States is:

1. In combination, a circuit breaker having terminal portions, an internal circuit connecting said terminal portions, high voltage insulating housing means at least partially enclosing said internal circuit, a pair of current transformers having windings mounted on said housing and about said internal circuit, said transformers being adapted to control external protective equipment, at least one of said transformer windings being remote from said terminal portions so that a zone of said internal circuit extending between said windings extends through only a portion of said internal circuit, conductive shielding mounted adjacent said windings and providing a first current path to ground electrically between said windings and a second current path to ground external to said windings, conductive shielding means encompassed by said windings for forcing faults in said internal circuit including faults outside of and at either side of said zone to follow said first path, and means for causing faults external to said internal circuit to follow said second path and to be excluded from the portion of said shielding means which is encompassed by said windings, whereby proper control of said protective equipment by said current transformers may be obtained.

2. The combination of claim 1 being further characterized by at least one of said windings being linked to a generally tubular magnetic core disposed about a portion of said internal circuit, and said conductive shielding means comprising conducting structure mounted radially inwardly of said core and encompassed by said core.

3. The combination of claim 2 in which said conducting structure has a generally tubular configuration and extends along said internal circuit throughout a major portion of the length of said zone.

4. In combination, electric apparatus having terminal portions, an internal circuit connecting said terminal portions, high voltage insulating housing means at least partially enclosing said internal circuit, a pair of current transformers having secondary windings mounted about said internal circuit, said transformers being adapted to control external protective equipment, said windings being mounted in juxtaposition and forming an assembly located between the terminal portions of the apparatus in a position remote from at least one of said terminal portions, said assembly comprising conductive shielding providing a first breakdown path to ground electrically between said windings and a second breakdown path to ground external to said windings and essentially independent of inductive linkage with said windings, conductive shielding means for forcing faults in said internal circuit including those faults occurring at points remote from said assembly to follow said first path, and means for causing faults external to said internal circuit to follow said second path, whereby proper control of said protective equipment by said current transformers may be obtained.

5. The combination of claim 4 being further characterized by at least one of said windings being linked to a generally tubular magnetic core disposed about a portion of said internal circuit, and said conductive shielding means comprising conducting structure mounted radially inwardly of said core and encompassed by said core.

6. The combination of claim 5 in which said conducting structure has a generally tubular configuration and extends along a major portion of axial length of said assembly.

7. The circuit breaker of claim 1 having separable contacts forming a part of said internal circuit, one contact being relatively fixed, the windings of said pair of current transformers being mounted at one electrical side only of the fixed contact.

8. The apparatus of claim 4 having separable circuit interrupting contacts forming a part of said internal circuit, one contact being relatively fixed, the windings of said pair of current transformers being mounted at one electrical side only of the fixed contact.

9. In an electrical system having sections interconnected through a circuit breaker, said circuit breaker having terminal portions which are connected to said sections and having an internal circuit interconnecting said terminal portions, a differential relay arrangement controlled by current transformers secondary windings associated in electrically overlapping relationship on said circuit breaker, said windings being mounted about said internal circuit, said relay arrangement being adapted to selectively or collectively effect isolation of said sections depending upon the location of a fault in the system, said transformers having windings mounted between said terminal portions; the improvement being characterized by: at least one of said transformer windings being remote from said terminal portions so that a zone of said internal circuit extending between said transformer windings extends through only a part of said internal circuit, conductive shielding disposed adjacent said windings and providing a first current path to ground electrically between said windings and a second current path to ground external to said windings, conductive shielding means encompassed by said windings for forcing faults in said internal circuit including faults outside of and at either side of said zone to follow said first path, and means for causing fault currents external to said internal circuit to follow said second path and to be excluded from the portion of said shielding means encompassed by said windings, whereby said transformers may accurately distinguish between faults in said internal circuit and those external thereto so as to properly control said relay arrangement.

10. In an electrical system having sections interconnected through a circuit breaker, said circuit breaker having terminal portions which are connected to said sections and having an internal circuit interconnecting said terminal portions, a differential relay arrangement controlled by current transformer windings associated in electrically overlapping relationship on said circuit breaker, said windings being mounted about said internal circuit, said relay arrangement being adapted to selectively or collectively effect isolation of said sections depending upon the location of a fault in the system; the improvement being characterized by said windings being mounted in juxtaposition and forming an assembly located between the terminal portions of the breaker in a position remote from at least one of said terminal portions, conductive shielding mounted adjacent said windings and providing a first current path to ground electrically between said windings and inductively linked with one of said windings and a second breakdown path to ground external to said windings and essentially independent of inductive linkage with said windings, conductive means for forcing faults in said internal circuit including those faults occurring at points remote from said assembly to follow said first path, and means for causing faults external to said internal circuit to follow said second path.

11. The apparatus of claim 10 being further characterized by at least one of said windings being linked to a generally tubular magnetic core disposed about a portion of said internal circuit, and said conductive means comprising a conducting structure mounted radially inwardly of said core and encompassed by said core.

12. The apparatus of claim 11 in which said conducting structure extends along a major portion of the axial length of said current transformer assembly.

13. The apparatus of claim 10 in which said circuit breaker has separable contacts forming a part of said internal circuit, one contact being relatively fixed, said assembly being located at one electrical side only of said fixed contact.

14. In an electrical system having sections interconnected through a circuit breaker, said circuit breaker having terminal portions which are respectively connected to said sections and having an internal circuit interconnecting said terminal portions, differential protective relays operable to selectively or collectively effect isolation of said sections depending upon the location of a fault in the system, means for controlling said relays comprising a pair of current transformer windings mounted in electrically overlapping relationship about the internal circuit of said circuit breaker, at least one of said transformer windings being located remote from said terminal portions whereby the zone of said internal circuit which extends between said transformer windings extends through only a portion of said internal circuit, conductive shielding structure insulatingly interposed between said internal circuit and said windings and encompassed by said windings, conducting structure connecting said shielding structure to ground and extending to ground by a path disposed electrically between said windings, said shielding structure being arranged to conduct substantially all faults in said internal circuit to said conducting structure whereby substantially all faults within said internal circuit will flow to ground through said path extending electrically between said windings.

15. The combination of claim 14 in which the conductive path provided by said conducting structure is the sole conductive path between said shielding structure and ground.

16. In combination, a circuit breaker having terminal portions, an internal circuit interconnecting said terminal portions, high voltage insulating housing means at least partially enclosing said circuit, a pair of current transformers having secondary windings mounted on said housing means and about said internal circuit, said transformer windings being adapted to control external protective equipment, at least one of said transformer windings being remote from said terminal portions whereby the zone of said internal circuit which extends between said windings extends through only a portion of said internal circuit, conductive shielding structure insulatingly interposed between said internal circuit and said windings and encompassed by said windings, conducting structure connecting said shielding to ground and extending to ground by a path disposed electrically between said windings, said shielding structure being arranged to conduct substantially all faults in said internal circuit to said conducting structure whereby substantially all of said internal faults will flow to ground through said path extending electrically between said windings.

17. The combination of claim 16 in which the conductive path to ground provided by said conducting structure is the sole conductive path between said shielding structure and ground.

18. In protective equipment for an electrical system having a plurality of sections, electrical apparatus having spaced terminal portions for respective connection to said sections, said apparatus comprising an internal circuit extending between said terminals and insulating housing means at least partially enclosing said internal circuit, a pair of current transformer secondary windings adapted to be coupled in differential-current responsive relationship with said system sections and mounted in electrically-overlapping relationship about said internal circuit, at least one of said windings being located remote from said terminal portions whereby the zone of said internal circuit which extends between said windings extends over only a portion of said internal circuit, conductive shielding structure insulatingly interposed between said internal circuit and said windings and encompassed by said windings, conducting structure connecting said shielding structure to ground and extending to ground by a path disposed electrically between said windings, said shielding structure being arranged to conduct substantially all faults in said internal circuit to said conducting structure, whereby substantially all of said internal faults will flow to ground through said path extending electrically between said windings.

19. The combination of claim 18 in which the conductive path provided by said conducting structure is the sole conductive path between said shielding structure and ground.

20. The combination of claim 19 in which the breakdown strength between any point in said internal circuit and said grounded shielding structure is lower than the breakdown strength between said point and any other adjacent grounded structure.

21. The apparatus of claim 19 in combination with grounded conductive casing means mounted about the exterior of said windings and forming a possible breakdown path to ground for faults external to said internal circuit, and means insulating said casing means from the shielding structure encompassed by the windings except for an electrical connection provided by the conducting structure of claim 19 which extends from said shielding structure to ground electrically between said windings.

22. In a differential protective system, electric apparatus having terminal portions and an internal circuit interconnecting said terminal portions, a pair of current transformer secondary windings mounted about said internal circuit and adapted to be connected in electrically overlapping relationship in said differential protective system, at least one of said windings being remote from said terminal portions so that the zone of said internal circuit which extends between said windings extends through only a portion of said internal circuit, insulating housing means enclosing the portion of said internal circuit which is outside of said zone, grounded conductive shielding structure insulatingly interposed between each of said windings and said internal circuit and encompassed by said windings, conducting means extending from said shielding structure to ground electrically between said windings and providing the sole conductive path between said shielding structure and ground, said shielding structure being arranged to conduct substantially all faults in said internal circuit to said conducting means whereby substantially all of said internal faults are directed to ground by a path electrically between said windings.

23. The apparatus of claim 22 in which for substantially all possible breakdown paths leading from said internal circuit to ground the grounded shielding structure which is encompassed by said windings is interposed in the breakdown path between said internal circuit and any other adjacent grounded structure.

24. The apparatus of claim 22 in combination with grounded conductive casing means mounted about the exterior of said windings, and forming a possible breakdown path to ground for faults external to said internal circuit, and means insulating said casing means from the shielding structure which is encompassed by the windings except for an electrical connection provided by the conducting means of claim 22 which extends from said shielding structure to ground electrically between said windings.

25. The apparatus of claim 24 in which for substantially all possible breakdown paths leading from said internal circuit to ground the shielding structure which is encompassed by said windings is interposed in the breakdown path between said internal circuit and any other adjacent grounded structure.

References Cited in the file of this patent

UNITED STATES PATENTS

| 2,114,189 | Kronmiller | Apr. 12, 1938 |
| 2,374,054 | Travers | Apr. 17, 1945 |
| 2,548,625 | Seeley | Apr. 10, 1951 |
| 2,677,077 | Knudson | Apr. 27, 1954 |
| 2,677,078 | Knudson | Apr. 27, 1954 |